(12) United States Patent
Périé

(10) Patent No.: US 7,997,140 B2
(45) Date of Patent: Aug. 16, 2011

(54) METHOD AND APPARATUS FOR TROUBLESHOOTING NOISE/VIBRATION ISSUES OF ROTATING COMPONENTS

(75) Inventor: Christian Guy Périé, Colomiers (FR)

(73) Assignee: Pratt & Whitney Canada Corp., Longueuil (CA)

( * ) Notice: Subject to any disclaimer, the term of this patent is extended or adjusted under 35 U.S.C. 154(b) by 345 days.

(21) Appl. No.: 12/259,506

(22) Filed: Oct. 28, 2008

(65) Prior Publication Data
US 2010/0101310 A1    Apr. 29, 2010

(51) Int. Cl.
*G01N 29/46* (2006.01)
*G01M 15/00* (2006.01)
*G06F 17/00* (2006.01)
*H04R 29/00* (2006.01)

(52) U.S. Cl. .......... 73/660; 73/114.75; 73/593; 73/659; 381/56; 700/94

(58) Field of Classification Search ............... 73/114.25, 73/593, 599, 649, 659, 660; 700/94; 381/56
See application file for complete search history.

(56) References Cited

U.S. PATENT DOCUMENTS

| | | | |
|---|---|---|---|
| 4,038,866 A | | 8/1977 | Johnson |
| 4,228,439 A | * | 10/1980 | Weingartner ............... 346/33 R |
| 4,550,604 A | | 11/1985 | Sugimoto et al. |
| 5,435,185 A | | 7/1995 | Eagan |
| 5,445,026 A | | 8/1995 | Eagan |
| 6,009,356 A | | 12/1999 | Monroe |
| 6,360,607 B1 | | 3/2002 | Charette et al. |
| 6,766,692 B1 | | 7/2004 | Eagan |
| 6,772,633 B2 | | 8/2004 | Terry et al. |
| 7,187,773 B2 | | 3/2007 | Hamada et al. |
| 7,263,407 B2 | * | 8/2007 | Kuwaoka ........................ 700/94 |
| 7,305,870 B2 | | 12/2007 | Ganassi et al. |
| 7,325,456 B2 | | 2/2008 | Kim |
| 2009/0177354 A1 | * | 7/2009 | Agrawal et al. ................ 701/35 |
| 2010/0161089 A1 | * | 6/2010 | Phelippeau et al. ............ 700/94 |

FOREIGN PATENT DOCUMENTS
JP     02005062154 A  *  3/2005

* cited by examiner

*Primary Examiner* — Jacques M Saint Surin
(74) *Attorney, Agent, or Firm* — Bachman & LaPointe, P.C.

(57) ABSTRACT

There is provided a method for troubleshooting noise/vibration issues of rotating components, the method comprising: receiving an audio signal of the rotating components in operation; generating a frequency spectrum corresponding to the audio signal; selecting a frequency $v_m$ in the frequency spectrum corresponding to a maximum amplitude; and comparing the frequency $v_m$ to a set of predetermined rotational speeds of the rotating components to find a match; thereby identifying a potentially defective component.

17 Claims, 4 Drawing Sheets

METHOD AND APPARATUS FOR TROUBLESHOOTING NOISE/VIBRATION ISSUES OF ROTATING COMPONENTS

TECHNICAL FIELD

The application relates generally to the field of troubleshooting noise or vibration issues in various types of equipment such as engines, transmissions, and other rotating components.

BACKGROUND OF THE ART

When abnormal noise or vibrations are detected in a system (e.g. gas turbine engine) comprising rotating components, troubleshooting methods are used to determine the root cause of the abnormal noise or vibrations. However, these methods are time consuming and expensive. For example, one troubleshooting method consists in removing components of the system one after the other and operating the system. The defective component is identified as being the component of which the absence in the system results in the elimination of the abnormal noise or vibrations. Alternatively, expensive diagnosis tools can be used to identify the defective component.

Accordingly, there is a need to provide an improved and convenient method for troubleshooting noise/vibrations issues in a system comprising rotating components.

SUMMARY

In one aspect, there is provided a method for troubleshooting noise/vibration issues of rotating components, the method comprising: receiving an audio signal of the rotating components in operation; generating a frequency spectrum corresponding to the audio signal; selecting a frequency $v_m$ in the frequency spectrum corresponding to a maximum amplitude; and comparing the frequency $v_m$ to a set of predetermined rotational speeds of the rotating components to find a match; thereby identifying a potentially defective component.

In a second aspect, there is provided a system for troubleshooting noise/vibration issues of rotating components, the system comprising: a frequency spectrum generator adapted to receive an audio signal of the rotating components in operation and to generate a frequency spectrum corresponding to the audio signal; a frequency determining module connected to the frequency spectrum generator and adapted to receive the frequency spectrum and to select a frequency $v_m$ in the frequency spectrum corresponding to a maximum amplitude; and an identification module connected to the frequency determining module and adapted to receive the frequency $v_m$ and a set of rotational speeds of the rotating components, and to compare the frequency $v_m$ to the set of rotational speeds to find a match; thereby identifying a potentially defective component.

In a third aspect, there is provided a system for troubleshooting noise/vibration issues of rotating components, the system comprising: a processor in a machine in connection with a memory, the processor adapted to receive an audio signal of the rotating components in operation; and an application coupled to the processor, the application being adapted to: generate a frequency spectrum corresponding to the audio signal; select a frequency $v_m$ in the frequency spectrum corresponding to a maximum amplitude; and compare the frequency $v_m$ to a set of predetermined rotational speeds of the rotating components to find a match; thereby identifying a potentially defective component.

DESCRIPTION OF THE DRAWINGS

Reference is now made to the accompanying figures, in which.

DETAILED DESCRIPTION

Figure 1:
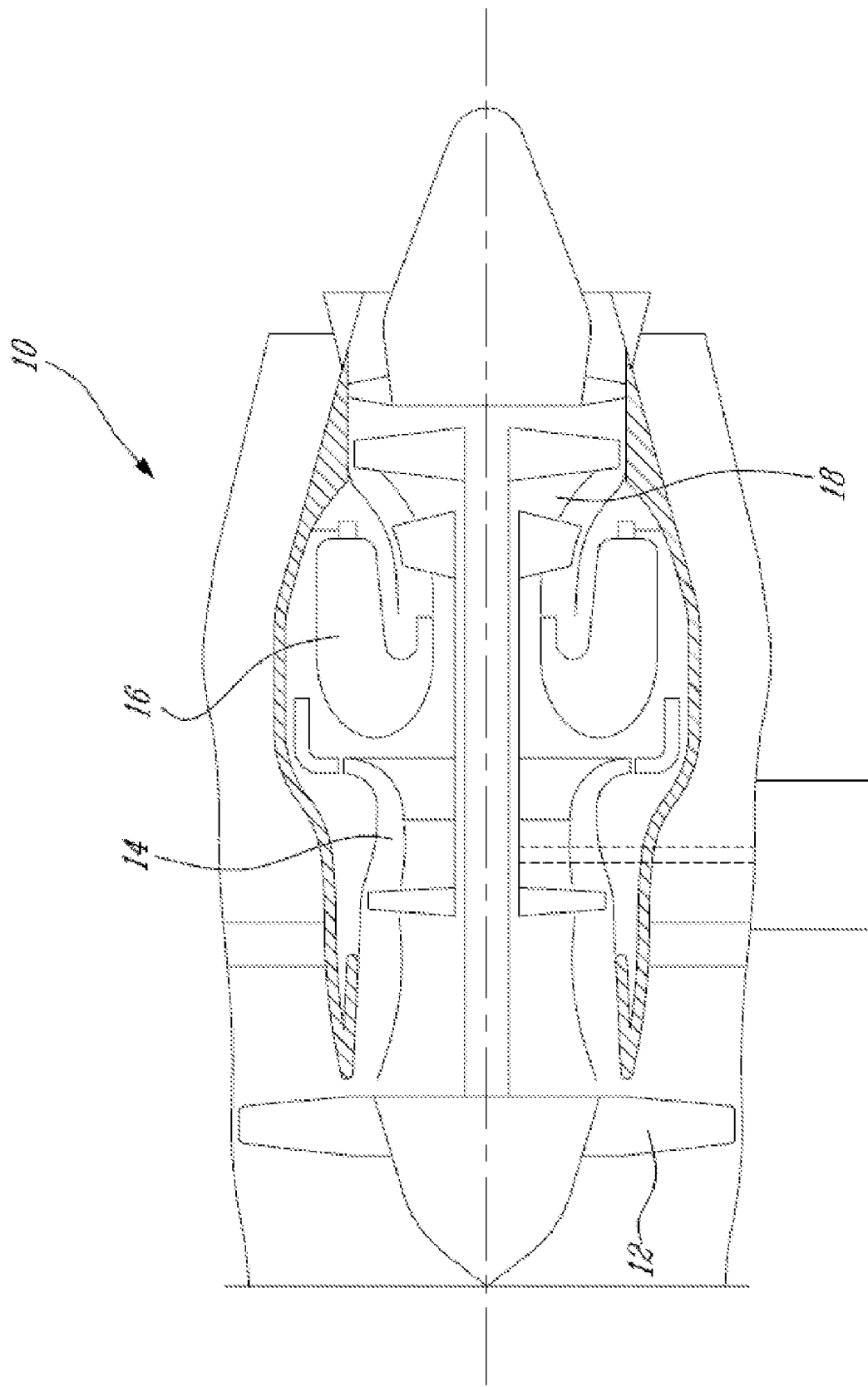
FIG. 1 is a schematic cross-sectional view of a gas turbine engine having rotating components which needs to be periodically inspected for detecting potential problems.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
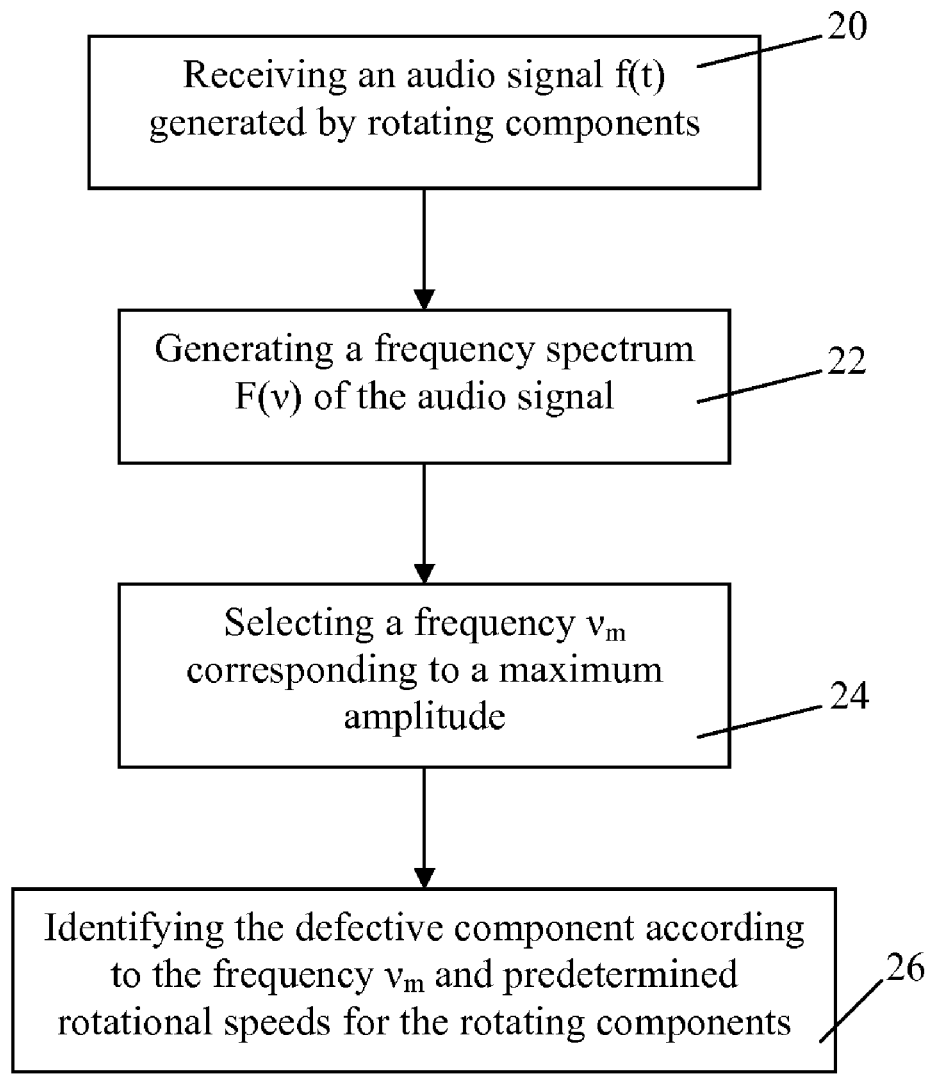
FIG. 2 is a flow chart of a method for troubleshooting noise/vibration issues of rotating components, in accordance with an embodiment.

FIG. 2 is a flow chart of an embodiment of a method for troubleshooting noise/vibration issues in a system comprising rotating components. For example, the system can be a gas turbine engine such as the gas turbine engine 10 described in FIG. 1. The first step 20 of the method is the reception of an audio signal f(t) generated by the rotating components while in operation. The audio signal f(t) represents the amplitude, the power or the intensity of the sound waves generated by the rotating components in operation as a function of time. It should be understood that the audio signal f(t) may be generated by the system when only some of the rotating components are in operation.

In one embodiment, the audio signal f(t) is digital and it is uploaded from a recording device. The recording device can be any device adapted to record an audio signal f(t). Examples of a recording device are a mobile phone provided with a microphone, a camera provided with a microphone, and the like. Accordingly, it can be appreciated that the audio signal f(t) can be recorded on a wide variety of commonly available handheld consumer recording devices. Alternatively, the audio signal f(t) can be received from a remote location via a communication link such as the Internet or a local network, for example.

In another embodiment, the audio signal f(t) is analog and it is subsequently converted to a digital audio signal f(t).

Figure 3:
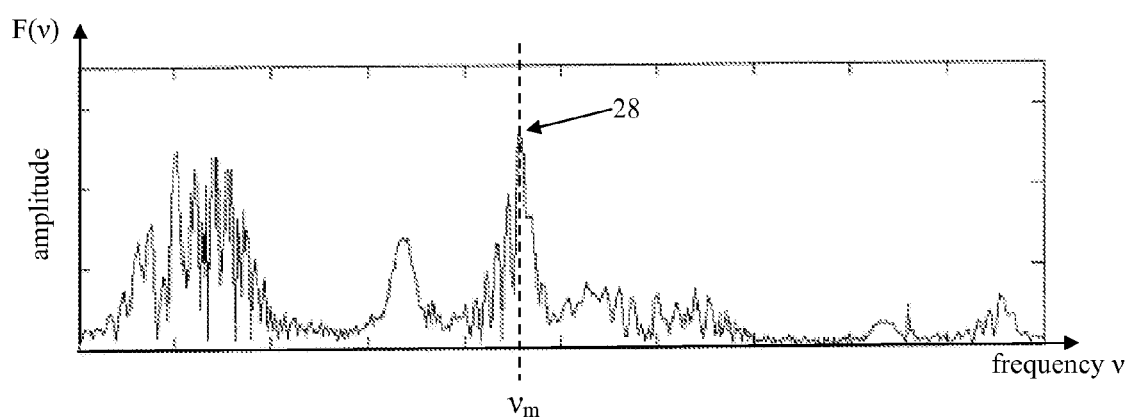
FIG. 3 illustrates a frequency spectrum, in accordance with an embodiment.

The second step 22 of the method illustrated in FIG. 2 is the generation of a frequency spectrum F(v) corresponding to the audio signal f(t). Any suitable technique may be employed, but it is noted that "off-the-shelf" software capable of generating suitable frequency spectrum are widely available from a plurality of sources via Internet, and in many cases, such software is available for free of charge, or for a nominal fee. The frequency spectrum F(v) corresponds to a Fourier transform of the audio signal f(t). While the received audio signal f(t) is in the time domain, the frequency spectrum F(v) represents the audio signal in the frequency domain. FIG. 3 illustrates an example of a frequency spectrum F(v) which presents the amplitude of the audio signal as a function of the frequency. The frequency spectrum F(v) represents the amplitude, the power or the intensity of the audio signal as a function of the frequency v of the sound waves. The x-axis of the frequency spectrum F(v) can be expressed in any units of measurement representing a frequency depending on the chosen Fourier transform.

In one embodiment, only a part of the audio signal f(t) is converted to a frequency spectrum F(v). A user of the method selects only the part of the audio signal f(t) considered to include the highest amplitude, and only this part of the audio signal f(t) is converted to a frequency spectrum F(v).

The third step 24 of the method is the determination of the frequency $v_m$ corresponding to a maximum amplitude of the frequency spectrum. Referring to FIG. 3, point 28 of the frequency spectrum represents the highest amplitude and the frequency $v_m$ corresponding to the maximum amplitude is given by the abscissa of the point 28.

The last step 26 of the method is identification of the rotational component which is the root cause of the abnormal noise/vibration. The frequency $v_m$ is compared to predetermined rotational speeds for the rotating components to find a match. The potentially defective component is identified as being the rotating component for which the predetermined rotational speed substantially corresponds to the frequency $v_m$. If the unit of measurement of the frequency v corresponds to that of the predetermined rotational speeds, the potentially defective component is the rotating component for which the predetermined rotational speed is substantially equal to the frequency $v_m$. If the unit of measurement of the frequency v does not correspond to that for the predetermined rotational speeds, a conversion of units is performed so that the frequency $v_m$ and the predetermined rotational speeds can be compared.

In one embodiment, the Fourier transform chosen to generate the spectrum frequency F(v) is the following:

$$F(v) = \int_{-\infty}^{+\infty} f(t)e^{-2\pi i v t} dt$$

and the x-axis of the frequency spectrum is expressed in Hertz (Hz). The predetermined rotational speeds of the rotating components are expressed in revolution per minute (RPM). The selected frequency $v_m$ is then expressed in Hertz. In order to determine the potentially defective rotating component, the frequency $v_m$ is converted to per minute units according to the following equation:

$$v_m \text{ (per minute)} = v_m \text{ (Hz)}.60 \text{ (s)}$$

The potentially defective component is then identified as being the rotating component for which the predetermined rotational speed is substantially equal to the frequency $v_m$ expressed in per minute units. Alternatively, the predetermined rotational speeds can be converted to revolution per second to match the unit of the frequency $v_m$ and then compared to the frequency $v_m$.

In one embodiment, the frequency spectrum F(v) generated at the step 22 represents the amplitude of the audio signal as a function of a frequency v expressed in per minute units according to the following equation:

$$F(v) = \int_{-\infty}^{+\infty} f(t)e^{-120\pi i v t} dt$$

and the predetermined rotational speeds are expressed in RPM. In this embodiment, no step of conversion of units is needed and the potentially defective component is identified by comparing the frequency $v_m$ expressed in per minute units with the predetermined rotational speeds.

In one embodiment, the frequency spectrum F(v) generated at step 22 represents the amplitude of the audio signal as a function of a frequency expressed in Hertz and the predetermined rotational speeds are expressed in RPM. Both the frequency $v_m$ and the predetermined rotational speeds are converted to a common unit, such as radians per second for example, and the potentially defective component is identified as being the rotating component which has a predetermined rotational speed expressed in radians per second substantially equivalent to the frequency v expressed in radians per second.

In one embodiment, the predetermined rotational speed for all of the rotating components are experimentally measured while the rotating components are in operation. The predetermined rotational speeds can also be average measured rotational speeds. For example, if the audio signal has a duration of 1 second, the predetermined rotational speed of a rotating component can be the average measured rotational speed of that component over the 1 second period of time. In another embodiment, the predetermined rotational speed for a first group of rotating components is measured and the rotational speed for a second group of rotating components is determined according to the measured rotational speeds for the first group. Any method known to a person skilled in the art for determining or measuring the rotational speed for the rotating components can be used.

In one embodiment, a camera is used for both recording the audio signal and registering the measured rotational speeds. For example, if the rotating components are part of a gas turbine engine of an aircraft, a video of the cockpit control panels can be recorded or pictures of the control panels are taken using the camera. The pictures or the video of the control panels recorded by the camera provide the measured rotational speeds of the rotating components while the audio track of the video provides the audio signal.

It should be understood that the method illustrated in FIG. 2 may be executed by a machine provided with a processor and a memory. The processor is then configured to execute all of the steps of the method.

Figure 4:
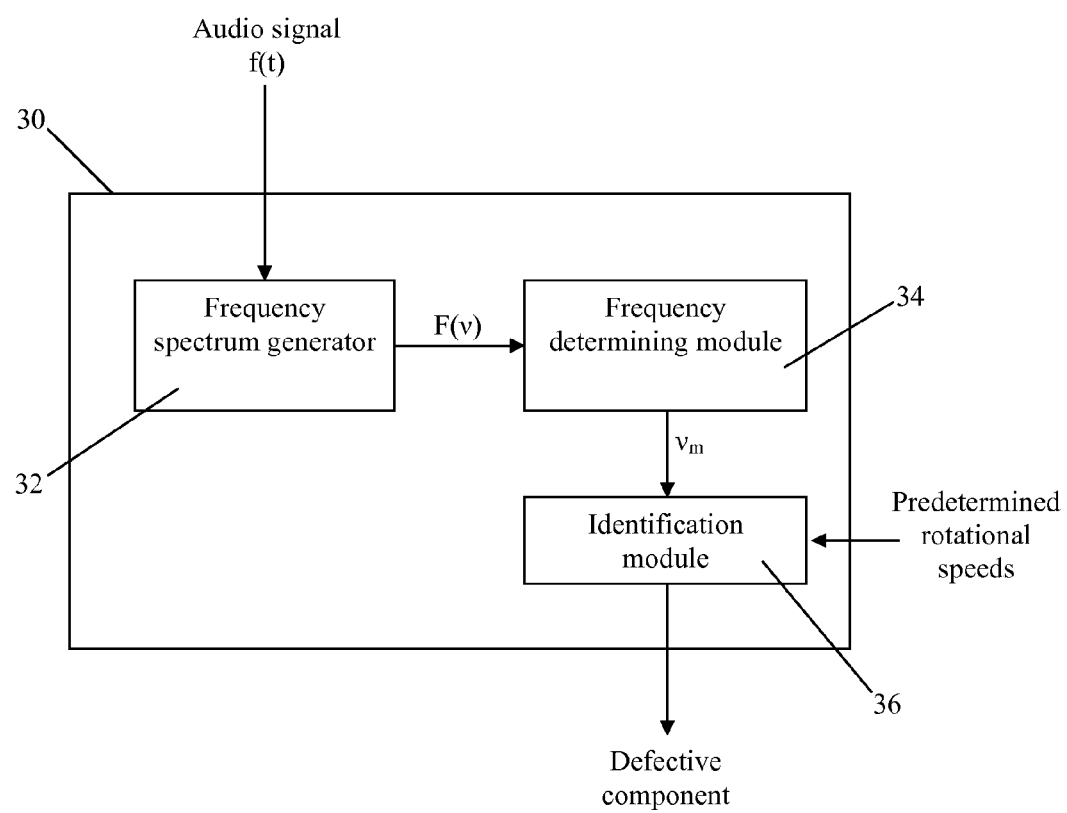
FIG. 4 is a system for troubleshooting noise/vibration issues of rotating components, in accordance with an embodiment.

FIG. 4 illustrates one embodiment of a system 30 for troubleshooting noise/vibration issues in a system comprising rotating components. The system 30 comprises a frequency spectrum generator 32, a frequency determining module 34, and an identification module 36. The frequency spectrum generator 32 is adapted to receive an audio signal f(t) of the rotating components and to generate a frequency spectrum F(v) corresponding to the audio signal f(t). The frequency spectrum generator 32 is in communication with the frequency determining module 34. Upon reception of the frequency spectrum F(v), the frequency determining module 34 identifies the maximum amplitude in the frequency spectrum F(v) and determines the frequency $v_m$ which corresponds to the maximum amplitude. The frequency determining module 34 is connected to the identification module 36 which is adapted to determine which one of the rotating components is the cause of the abnormal noise/vibrations. The identification module 36 is adapted to receive predetermined rotational speeds for the rotating components and to compare the frequency $v_m$ to the predetermined rotational speeds. The potentially defective component is the rotating component for which the predetermined rotational speed substantially corresponds to the frequency $v_m$.

In one embodiment, the identification module 36 is further adapted to convert at least one of the frequency $v_m$ and the predetermined rotational speeds so that the frequency and the predetermined rotational speeds are expressed in a common unit. Then, the potentially defective component is the rotating component of which the predetermined rotational speed is substantially equal to the frequency $v_m$.

In one embodiment, the system 30 further comprises a memory connected to the frequency spectrum generator 32 and the identification module 36. The audio signal and the predetermined rotational speeds are stored in this memory. The frequency spectrum generator 32 receives the audio signal f(t) from the memory. The frequency spectrum generator 32 is also adapted to determine the units of the predetermined rotational speeds and to generate the frequency spectrum F(v) according to these units so that the frequency $v_m$ is expressed in the same units as the predetermined rotational speed. Alternatively, the frequency spectrum generator 32 can be connected to the identification module 36 which receives the predetermined rotational speeds. The frequency spectrum generator 32 accesses the identification module 36 in order to determine the units of measurement of the predetermined rotational speeds and the frequency spectrum generator 32 generates the frequency spectrum according to the unit of measurement of the predetermined rotational speeds.

In one embodiment, a microphone is connected to the system 30 either directly or indirectly via a network such as the Internet, and the identification of the potentially defective component is performed in real-time. In another embodiment, the audio file is recorded on a device having a microphone and a memory, and the audio file is subsequently transmitted to the system 30.

The above description is meant to be exemplary only, and one skilled in the art will recognize that changes may be made to the embodiments described without departing from the scope of the invention disclosed. For example, while in an embodiment of the method, a handheld digital camera is used for recording for the audio signal and the predetermined rotational speeds, a mobile phone provided with a camera and a microphone can also be used. The approach may be applied to any rotating machinery or component, and is not limited to aircraft-borne turbine engines or their accessories. Still other modifications which fall within the scope of the present invention will be apparent to those skilled in the art, in light of a review of this disclosure, and such modifications are intended to fall within the appended claims.

What is claimed is:

1. A method for troubleshooting noise/vibration issues of rotating components, said method comprising:
   receiving an audio signal of said rotating components in operation;
   generating a frequency spectrum corresponding to the audio signal;
   selecting a frequency $v_m$ in said frequency spectrum corresponding to a maximum amplitude; and
   comparing said frequency $v_m$ to a set of predetermined rotational speeds of said rotating components to find a match; thereby identifying a potentially defective component.

2. The method as defined in claim 1, wherein said receiving an audio signal comprises digitally recording said audio signal on a handheld device and uploading said audio signal from said handheld device to a personal computer.

3. The method as defined in claim 2, wherein said digitally recording said audio signal comprises recording said audio signal via a microphone provided on the device, the device being one of a camera, a mobile phone and a personal entertainment device.

4. The method as defined in claim 3, further comprising using the device to record at least one image of a control panel gauge indicating said predetermined rotational speeds.

5. The method as defined in claim 1, wherein said receiving an audio signal, said generating a frequency spectrum, said selecting a frequency and said comparing are performed in real-time.

6. The method as defined in claim 1, wherein further comprising converting at least one of said frequency $v_m$ and said set of predetermined rotational speeds to a given units of measurement to obtain a common unit of measurement.

7. A system for troubleshooting noise/vibration issues of rotating components, said system comprising:
   a frequency spectrum generator adapted to receive an audio signal of said rotating components in operation and to generate a frequency spectrum corresponding to said audio signal;
   a frequency determining module connected to said frequency spectrum generator and adapted to receive said frequency spectrum and to select a frequency $v_m$ in said frequency spectrum corresponding to a maximum amplitude; and
   an identification module connected to said frequency determining module and adapted to receive said frequency $v_m$ and a set of rotational speeds of said rotating components, and to compare said frequency $v_m$ to said set of rotational speeds to find a match; thereby identifying a potentially defective component.

8. The system as defined in claim 7, further comprising a handheld device adapted to record and transmit said audio signal to said frequency spectrum generator.

9. The system as defined in claim 8, wherein said handheld device is one of a camera and a mobile phone, said camera and said mobile phone being provided with a microphone.

10. The system as defined in claim 9, wherein said camera and said mobile phone are adapted to one of take pictures and record a video of control panels indicating said predetermined rotational speeds.

11. The system as defined in claim 7, wherein said identification module is adapted to convert at least one of said frequency $v_m$ and said set of predetermined rotational speeds to a given unit of measurement to obtain a common unit of measurement.

12. The system as defined in claim 7, wherein said frequency spectrum generator is connected to said identification module and said frequency spectrum generator is adapted to generate a frequency spectrum according to a unit of measurement of said predetermined rotational speeds.

13. A system for troubleshooting noise/vibration issues of rotating components, said system comprising:
   a processor in a machine in connection with a memory, said processor adapted to receive an audio signal of said rotating components in operation; and
   an application coupled to said processor, said application being adapted to:
      generate a frequency spectrum corresponding to said audio signal;
      select a frequency $v_m$ in said frequency spectrum corresponding to a maximum amplitude; and compare said frequency $v_m$ to a set of predetermined rotational speeds of said rotating components to find a match; thereby identifying a potentially defective component.

14. The system as defined in claim 13, further comprising a handheld device adapted to record and transmit said audio signal to said processor.

15. The system as defined in claim 14, wherein said handheld device is one of a camera and a mobile phone, said camera and said mobile phone being provided with a microphone.

16. The system as defined in claim 15, wherein said camera and said mobile phone are adapted to one of take pictures and record a video of control panels indicating said predetermined rotational speeds.

17. The system as defined in claim 13, wherein said application is adapted to convert at least one of said frequency $v_m$ and said set of predetermined rotational speeds to a given unit of measurement to obtain a common unit of measurement.

* * * * *